United States Patent [19]
Burgdorf et al.

[11] Patent Number: 5,318,066
[45] Date of Patent: Jun. 7, 1994

[54] SOLENOID VALVE FOR HYDRAULIC BRAKE UNITS WITH SLIP CONTROL

[75] Inventors: Jochen Burgdorf, Offenbach-Rumpenheim; Peter Volz, Darmstadt; Andre F. L. Goossens, Rumst, all of Fed. Rep. of Germany

[73] Assignee: Alfred Teves GmbH, Frankfurt am Main, Fed. Rep. of Germany

[21] Appl. No.: 856,038

[22] PCT Filed: Aug. 24, 1991

[86] PCT No.: PCT/EP91/01604
§ 371 Date: May 7, 1992
§ 102(e) Date: May 7, 1992

[87] PCT Pub. No.: WO92/04214
PCT Pub. Date: Mar. 19, 1992

[30] Foreign Application Priority Data
Sep. 7, 1990 [DE] Fed. Rep. of Germany ....... 4028447

[51] Int. Cl.⁵ .............................................. F16K 15/18
[52] U.S. Cl. ..................................... 137/529; 251/83
[58] Field of Search ................... 137/529, 540; 251/80, 251/83

[56] References Cited
U.S. PATENT DOCUMENTS
4,138,165  2/1979  Blomberg .
4,548,233 10/1985  Wolfges ............................. 137/529
4,631,923 12/1986  Smith ............................. 137/529 X FOREIGN PATENT DOCUMENTS
0256272  7/1987  European Pat. Off. .
0317305 11/1988  European Pat. Off. .
  30533  9/1956  Fed. Rep. of Germany .
2257213  7/1974  Fed. Rep. of Germany .
2740646  3/1979  Fed. Rep. of Germany .
3240276  5/1984  Fed. Rep. of Germany .
 841232  7/1960  United Kingdom .

*Primary Examiner*—Robert G. Nilson
*Attorney, Agent, or Firm*—Robert P. Seitter; J. Gordon Lewis

[57] ABSTRACT

A solenoid valve for hydraulic brake units with slip control is described which has a magnetic armature (2) surrounded by a valve dome (14), the magnetic armature (2) positioned by energization of a magnet coil (16), so that a valve needle (1) which is carried by the magnetic armature (2) is moved onto a valve seat (3). A hydraulic actuating force is generated by an arrangement causing the valve needle (1) to open even through the solenoid valve is energized causing the valve to act as a pressure relief or limiter valve.

5 Claims, 1 Drawing Sheet

SOLENOID VALVE FOR HYDRAULIC BRAKE UNITS WITH SLIP CONTROL

BACKGROUND OF THE INVENTION

The invention is related to a solenoid valve for hydraulic brake units with slip control.

In the solenoid valves for hydraulic brake units with slip control for example as shown in German patent application published without examination, U.S. Pat. No. 3,739,915, special pressure limiting valves which are structurally separate from the traction slip control inlet solenoid valves are provided in order to limit the pump pressure to an established maximum value. Indeed, during the traction slip control action, the traction slip control solenoid valves which take the form of isolating valves and are arranged downstream of the master cylinder, are closed. Thus, upon start up of the auxiliary pressure pumps for the purpose of traction slip control action, the brakes of the driven wheels are subjected to the system pressure being monitored by the pressure limiting valves, a return of hydraulic fluid through the pressure limiting valves into the master cylinder being rendered possible only by the admissible pressure of the traction slip control system being exceeded.

The requirement of separate pressure limiting valves lead to an expensive brake unit and has thus proved disadvantageous.

The invention has, therefore, the object to further develop a compact solenoid valve whose number of component parts is minimized by integration of the pressure limiter function.

SUMMARY OF THE INVENTION

According to the invention, this object is achieved by providing an arrangement for countering the electromagnetic actuating force, with a hydraulic actuating force to cause a functionally overlapping valve opening action depending on the system pressure. The solenoid valve according to the invention thus also act as a pressure limiting or relief valve.

The magnetic armature for the solenoid valve may be provided with a stepped, coaxial bore having one section for the accommodation of a spring element the spring element having one end engaging a valve needle. The bore has another section slidably guiding the valve needle for movement relative to the magnetic armature.

This arrangement allows pressure responsive control of the valve needle independently of the control caused by energization of the electromagnetic solenoid.

The valve needle may be formed with a stop which is abuttable against the step of the bore, the stop preferably in the shape of a stop disc which is fit to the one section of the bore in the magnetic armature. The stop disc is furnished with a central stud for locating the one end of the spring element.

In order to make the spring element act on the stop of the valve needle with a defined prestressing force, an axially adjustable thrust member may be inserted into the bore of the magnetic armature on the side opposite the magnetic armature, allowing adjustment of the compression of the spring element to achieve a desired prestressing force.

The thrust member is preferably formed with a restriction bore to insure a sufficient hydraulic damping of the sliding movement of the valve needle. As a consequence, the hydraulic pressure existing in the valve dome can act on the front surface of the valve needle stop in addition to the spring prestressing force, and as a result, a hydraulic opening force exerted on the valve needle must force out the hydraulic fluid within the bore in the magnetic armature through the restriction bore. The stiffness of the spring and the dimensioning of the restriction bore in the thrust member set the stroke speed of the valve needle during the pressure limiting function.

In order to support and guide the valve needle onto the valve seat, a guide element receiving one end of the valve needle is provided. The guide element has to be positioned as near as possible to the end of the valve needle.

A particularly good radial support of the valve needle within the guide element is provided by a cross sectional shape which extends convergently as well as divergently.

A plurality of through bores which are distributed about the circumference are provided in a flared portion of the guide element which faces the valve seat in order to insure an unrestricted passage of hydraulic fluid between the two hydraulic fluid ducts when the valve needle is in the open position.

DESCRIPTION OF THE DRAWINGS

The Figure is a cross sectional view of one embodiment of a solenoid valve according to the invention.

DETAILED DESCRIPTION

Figure 1:
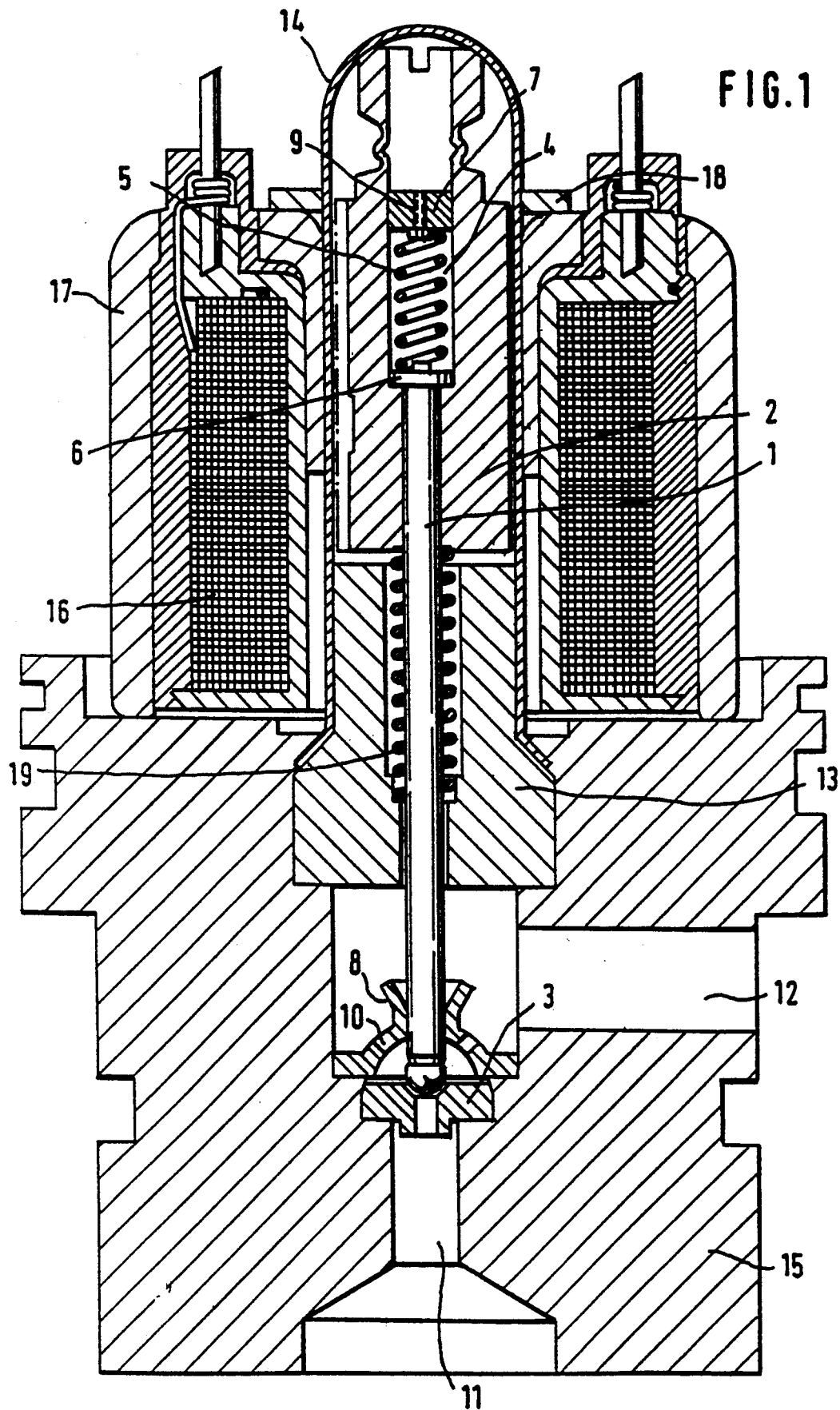

The magnetic valve core 13 with the relatively thin walled formed valve dome 14 is fixed within the valve housing 15, the magnetic coil 16 slipped over the dome 14 and fixed by means of a locking ring 18 which is abutted against the coil housings 17 and against the valve dome 14. In the embodiment according to FIG. 1, the valve needle 1 is in the electromagnetically non-energized, normal position which allows free passage of the hydraulic fluid through an annular clearance between the valve seat 3 and the lower end of a valve needle 1. An open hydraulic fluid connection thus exists between the first and the second hydraulic fluid ducts 11, 12.

In the electromagnetically non-energized normal position, a return spring 19 inserted between the magnetic core 13 and the magnetic armature 2 insures lifting-off of the valve needle 1 from the valve seat 3. A second spring element 5 positioned within the coaxial bore 4 of the magnetic armature 2 engages a stationary thrust member 7, and maintains the valve needle 1 in the normal position shown in the illustration. Mode of functioning:

Due to the actuating force which is brought about when the magnetic coil 16 is energized by electrical current, the valve needle 1 will move down against the valve seat 3 so that the hydraulic connection between the first and second hydraulic fluid ducts 11, 12 is interrupted. As soon as the pressure acting on the valve needle 1 in the first hydraulic fluid duct 11 exceeds a predetermined level, the valve needle 1 will retract. The predetermined pressure level depends on the force exerted by the spring element 5 and on the hydraulic damping caused by flow through the restriction bore 9 in the thrust member 7. The compression of the spring 5 is preadjusted by adjustment of the position of the thrust member 7 in the bore 4. The restriction bore 9 is also adjusted as necessary for this purpose.

Referring to the brake pressure control of the engine-driven vehicle wheels being subject to the risk of traction slip, that is to say, to the type of control of the brake pressure which is customary in hydraulic brake units with traction slip control, an inadmissibly high system pressure in the first hydraulic fluid duct 11 can open the valve needle 1 even though the solenoid valve is energized to act as an isolating valve to interrupt the hydraulic fluid connection to the second hydraulic fluid duct 12.

The excessive brake pressure existing in the first hydraulic fluid duct 11 is thus freely relieved through the opened valve seat 3 into the guide element 8 through radial hydraulic fluid passages 10 closely surrounding the valve needle 1. Radial hydraulic fluid passages 10 allow the brake pressure to be relieved without restriction in the direction of the second hydraulic fluid duct 12.

The structural configuration of the guide element 8 with a convergent and divergent shape is advantageous. The valve seat 3 may be fixed within the valve housing 15, the guide element 8 inserted in the opening of the valve housing 15 as a separate element.

Thus, in a comparatively simple way a solenoid valve is provided which acts also as a pressure relief valve and is optimized as to the few number of components and as a result a major reduction of the necessary component parts is achieved and, thus, of the overall space required, and leads to a decrease of the cost of the solenoid valve.

Due to the structural and functional integration of a pressure relief valve within an electromagnetically controlled two-position valve and to the consequent reduction of the component parts otherwise required, a functionally extended pilot valve is realized.

Other versions of the invention are possible. The present invention may be applied by analogy to all pressure fluids which have to be controlled electromagnetically and which require a system pressure control.

We claim:

1. A solenoid valve for hydraulic brake units with slip control, including a slave housing, having a first and second fluid passages therein communication therebetween to be controlled by said solenoid valve, a magnetic armature movably mounted within said valve housing, a surrounding magnetic coil energizable by electric current to cause stroke movement of said magnetic armature, an elongated valve needle drivingly carried with said magnetic armature a valve seat interposed between said first and second fluid passages, said valve seat fixed within said valve housing and having an opening defining a flow path between said first and second fluid passages, said valve needle extending through said second fluid passage and aligned with said valve seat opening, said valve needle having one end movable onto said valve seat to block said opening upon movement of said magnetic armature caused by energization of said magnet coil and thereby close communication of said first fluid passage with said second fluid passage, and pressure relief means responsive to development of a predetermined pressure in one of said fluid passages to cause unseating of aid one end of said valve needle and opening of communication between said first and second fluid passages notwithstanding said magnetic coil being energized;

said pressure relief means comprising means mounting said valve needle within said magnetic armature to allow relative movement therebetween upon development of said predetermined pressure;

said magnetic armature formed with a stepped bore slidably receiving the other end of said needle valve;

a spring element mounted in said bore, one end of said spring element engaging said other end of said valve needle;

said other end of said valve needle provided with a stop abuttable against said step in said bore; and a thrust member acting on the other end of said spring element and positioned within said bore in said magnetic armature spaced form said stop, to form an intervening space in said bore, said thrust member having defined therein a flow restriction adapted to allow outflow of fluid from said intervening space to adapted damp movement of said valve needle towards said thrust member.

2. A solenoid valve as claimed in claim 1, wherein said stop is formed by a flat stop disc which is formed with a central stud for the guidance of said spring element.

3. A solenoid valve as claimed in claim 1 wherein said thrust member is axially adjustable within said bore in said magnetic armature.

4. A solenoid valve for hydraulic brake units with slip control, including a valve housing, having a first and second fluid passages therein communication therebetween to be controlled by said solenoid valve, a magnetic armature movably mounted within said valve housing, a surrounding magnetic coil energizable by electric current to cause stroke movement of said magnetic armature, an elongated valve needle drivingly carried with said magnetic armature a valve seat interposed between said first and second fluid passages, said valve seat fixed within said valve housing and having an opening defining a flow path between said first and second fluid passages, said valve needle extending through said second fluid passage and aligned with said valve seat opening, said valve needle having one end movable onto said valve seat to block said opening upon movement of said magnetic armature caused by energization of said magnet coil and thereby close communication of said first fluid passage with said second fluid passage, and pressure relief means responsive to development of a predetermined pressure in one of said fluid passages to cause unseating of said one end of said valve needle and opening of communication between said first and second fluid passages notwithstanding said magnetic coil being energized;

a valve guide adjacent said valve seat slidably receiving said one end of said valve needle, said valve guide having a convergent and divergent shape defining a narrowest cross section, said narrowest cross section having an opening receiving said valve needle so as to be guided in radial directions.

5. A solenoid valve as claimed in claim 4, wherein said valve guide has at least one hydraulic fluid passage provided therein in which in the open position of said valve needle establishes a fluid connection between said first and second hydraulic fluid passage.

* * * * *